United States Patent [19]
Theissen

[11] 3,873,303
[45] Mar. 25, 1975

[54] HERBICIDAL USE AND COMPOSITION OF HALOPHENOXY BENZAMIDES

[75] Inventor: Robert J. Theissen, Westfield, N.J.

[73] Assignee: Mobil Oil Corporation, New York, N.Y.

[22] Filed: Sept. 12, 1973

[21] Appl. No.: 396,976

Related U.S. Application Data

[60] Continuation-in-part of Ser. No. 194,479, Nov. 1, 1971, Pat. No. 3,776,715, which is a division of Ser. No. 819,412, April 25, 1969, Pat. No. 3,652,645.

[52] U.S. Cl. .................................................. 71/118
[51] Int. Cl. ............................................. A01n 9/20
[58] Field of Search ............................. 71/118, 124

[56] References Cited
UNITED STATES PATENTS

| | | | |
|---|---|---|---|
| 3,169,849 | 2/1964 | Jemin | 71/107 |
| 3,423,470 | 1/1969 | Rohr et al. | 71/124 |
| 3,776,961 | 12/1973 | Theissen | 71/124 |
| 3,798,276 | 3/1974 | Boyer | 71/124 |

*Primary Examiner*—James O. Thomas, Jr.
*Attorney, Agent, or Firm*—Charles A. Huggett; Hastings S. Trigg

[57] ABSTRACT

2-Nitro-5-(halophenoxy)benzoic acids and esters, salts, amides, and acyl halides thereof comprise a class of compounds that are highly effective pre- and post-emergence herbicides.

14 Claims, No Drawings

HERBICIDAL USE AND COMPOSITION OF HALOPHENOXY BENZAMIDES

CROSS-REFERENCES TO RELATED APPLICATIONS

This application is a continuation-in-part of copending application Ser. No. 194,479, filed Nov. 1, 1971, now U.S. Pat. No. 3,776,715, which is a division of application Ser. No. 819,412, filed Apr. 25, 1969, now U.S. Pat. No. 3,652,645.

BACKGROUND OF THE INVENTION

1. Field of the Invention

This invention is concerned with certain phenoxybenzoic acid compounds and their use as herbicides.

2. Description of the Prior Art

It has been proposed to use as herbicides 2-methoxybenzoic acids (U.S. Pat. No. 3,013,054) and 4-phenoxybenzoic acids (French Pat. No. 1,502,538). It is the discovery of this invention however, that benzoic acids having a phenoxy substituent in the 5-position are very effective herbicides.

SUMMARY OF THE INVENTION

This invention provides the method for controlling plant growth that comprises applying an herbicidal amount of an herbicidal compound having the formula:

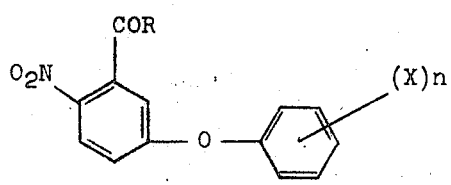

wherein X is halogen n is 1 to 5, and R is amido, alkylamido ($C_1$–$C_6$) preferably $C_1$–$C_4$, or dialkylamido ($C_1$–$C_6$) preferably $C_1$–$C_4$; and herbicidal composition containing said compound.

DESCRIPTION OF SPECIFIC EMBODIMENTS

The compounds of this invention are readily prepared by the Ullmann ether synthesis reaction between the alkali metal (Na, K) salt of a halophenol and a 5-halo (Cl, Br)-2-nitrobenzoic acid or an ester, amide, or salt thereof. The 5-halo-2-nitrobenzoic acid is readily prepared by nitrating a m-halotoluene, followed by oxidation of the methyl group by well-known procedures.

Non-limiting examples of the compounds of this invention are:

2-nitro-5-(2',4',6'-trichlorophenoxy)benzoic acid;
methyl 2-nitro-5-(2',4',6'-trichlorophenoxy)benzoate;
propyl 2-nitro-5-(2',4',6'-trichlorophenoxy)benzoate;
phenyl 2-nitro-5-(2',4',5'-trifluorophenoxy)benzoate;
2-nitro-5-(2',4',6'-triiodophenoxy)benzoic acid;
2-nitro-5-(2',4',6'-trichlorophenoxy)benzoyl chloride;
2-nitro-5-(2',4',6'-trichlorophenoxy)benzamide;
N-ethyl 2-nitro-5-(2',4',6'-trichlorophenoxy)benzamide;
N-isopropyl 2-nitro-5-(2',4',6'-trichlorophenoxy)benzamide;
N,N-dimethyl 2-nitro-5-(2',4',6'-trichlorophenoxy)benzamide;
sodium (or potassium) 2-nitro-5-(2',4',6'-trichlorophenoxy)-benzoate;
ethylammonium 2-nitro-5-(2',4',6'-trichlorophenoxy)benzoate;
ethanolammonium 2-nitro-5-(2',4',6'-trichlorophenoxy)benzoate;
sodium 2-nitro-5-(2',4',6'-trichlorophenoxy)benzoate;
methyl 2-nitro-5-(2',4',5'-trichlorophenoxy)benzoate;
methyl 2-nitro-5-(2',4'-dichlorophenoxy)benzoate;
and methyl 2-nitro-5(2',3',4',5',6'-pentachlorophenoxy)benzoate.

The following example illustrates the preparation of a typical compound of this invention and demonstrates a method for product recovery.

EXAMPLE 1

Methyl 2-nitro-5-(2',4',6'-trichlorophenoxy)benzoate

A stirred solution of methyl 5-chloro-2-nitrobenzoate (17.0 g., 0.079 mole) and the potassium salt of 2,4,6-trichlorophenol (18.6 g., 0.079 mole) in dimethyl sulfoxide (100 ml.) was heated at 90° for 17 hours. The cooled reaction mixture was diluted with water (500 ml.) and then extracted with ether (3 × 100 ml.). The combined ether fractions were washed with 10% sodium hydroxide solution (2 × 30 ml.) and then with a saturated aqueous sodium chloride solution. The ether solution was dried ($Na_2SO_4$) and the solvent evaporated to give a dark oil. Two crystallizations (petroleum ether) gave 1.91 g. of a pale yellow solid, m.p. 101°–103°.

Example 1
I.R. (nujol): c=o 1723, c—o 1240, and 1260 $cm^{-1}$
NMR ($CDCl_3$): methyl 3.91 ppm (3H), quartet
6.96 ppm (1H, J = 2.5 and 8 c.p.s.), doublet
7.5 ppm (1H, J= 2.5 c.p.s.), broad singlet
7.05 ppm (2H), and doublet 8.01 ppm (1H, J = 8 c.p.s.).

EXAMPLES 2 THROUGH 13

The ester of Example 1 was hydrolyzed to the corresponding acid and using known procedures for the preparation of amides, twelve other compounds within the scope of this invention were prepared. These compounds are:

2. 2-nitro-5-(2',4'-dichlorophenoxy)benzamide.
3. N-methyl 2-nitro-5-(2',4'-dichlorophenoxy)benzamide.
4. N,N-dimethyl 2-nitro-5-(2',4'-dichlorophenoxy)benzamide.
5. N-propyl 2-nitro-5-(2',4'-dichlorophenoxy)benzamide.
6. 2-nitro-5-(2',4',6'-trichlorophenoxy)benzamide.
7. N-methyl 2-nitro-5-(2',4',6'-trichlorophenoxy(benzamide.
8. N,N-dimethyl 2-nitro-5-(2',4',6'-trichlorophenoxy)benzamide.
9. N-propyl 2-nitro-5-(2',4'-6'-trichlorophenoxy)benzamide.
10. N-isopropyl 2-nitro-5-(2',4',6'-trichlorophenoxy)benzamide.
11. N,N-diethyl 2-nitro-5-(2',4',6'-trichlorophenoxy)benzamide.
12. N,N-dimethyl 2-nitro-5-(2',4'-dichloro-6'-fluorophenoxy)benzamide.
13. N-secbutyl 2-nitro-5-(2',4'-dichloro-6'-fluorophenoxy)benzamide.

For comparison, the following position isomer of Example 4 was prepared, the acid of which is disclosed in U.S. Pat. No. 3,475,427.

14. N,N-dimethyl-2-nitro-3-(2',4'-dichlorophenoxy)-benzamide.

The compounds of this invention can be applied in various ways to achieve herbicidal action. They can be applied, per se, as solids or in vaporized form, but are preferably applied as the toxic components in pesticidal compositions of the compounds and a carrier. The compositions can be applied, as dusts; as liquid sprays, or as gas-propelled sprays and can contain, in addition to a carrier, additives such as emulsifying agents, binding agents, gases compressed to the liquid state, odorants, stabilizers, and the like. A wide variety of liquid and solid carriers can be used. Non-limiting examples of solid carriers include talc, bentonite, diatomaceous earth, pyrophyllite, fullers earth, gypsum, flours derived from cotton seeds and nut shells, and various natural and synthetic clays having a pH not exceeding about 9.5. Non-limiting examples of liquid carriers, include water; organic solvents, such as alcohols, ketones, amides and esters; mineral oils, such as kerosene, light oils, and medium oils and vegetable oils, such as cottonseed oil.

In practice, herbicidal application is measured in terms of pounds of herbicide applied per acre. The compounds of this invention are effective herbicides when applied in herbicidal amounts, i.e., at rates between about 0.2 pounds and about 10 pounds per acre.

HERBICIDAL EFFECTIVENESS

Method of Propagating Test Species

| | |
|---|---|
| Crabgrass | *Digitaria sanguinalis* |
| Yellow Foxtail grass | *Setaria glauca* |
| Johnson grass | *Sorgum Halepense* |
| Barnyard grass | *Echinochloa crus-galli* |
| Amaranth pigweed | *Amaranthus retroflexus* |
| Turnip | *Brassica sp.* |
| Cotton | *Gossypium hirsutum* var. DPL smooth leaf |
| Corn | *Zea Mays* var. Golden Bantam |
| Bean | *Phaseolus vulgaris* var. Black Valentine |

All crop and weed species are planted individually in 3 inch plastic pots containing potting soil. Four seeds of each of corn, cotton, and snapbeans are seeded to a depth equal to the diameter of the seed. All other species are surface seeded and sprinkled with screened soil in an amount sufficient to cover the seeds. Immediately after planting, all pots are watered by sub-irrigation in greenhouse trays. Pots for the pre-emergence phase are seeded one day before treatment.

Planting dates for the post-emergence phase are varied so that all the seedlings will reach the desired stage of development simultaneously. The proper stage of seedling development for treatment in the post-emergence phase is as follows:

| | |
|---|---|
| GRASSES: | 2 inches in height |
| PIGWEED & TURNIPS: | 1 or 2 true leaves visible above cotyledons. |
| COTTON: | first true leaf 1 inch in length; expanded cotyledons. |
| CORN: | 3 inches – 4 inches in height. |
| BEANS: | primary leaves expanded, growing point at primary leaf node. |

METHOD OF TREATMENT

Spray applications are made in a hood containing a movable belt and fixed spray nozzle. For passage through the spray hood, one pot of each species (pre-emergence phase) is placed on the forward half of a wooden flat and one pot of established plants (post-emergence phase) is placed on the rear half of the flat. Treatments are moved to the greenhouse after spraying. Watering during the observation period is applied only by sub-irrigation.

Compounds are screened initially at a rate of application equivalent to 4 to 8 pounds per acre. Two weeks after treatment the pre- and post-emergence per cent injury is visually rated. Subsequent testing was carried out at 2,1 and 0.5 pounds per acre.

Herbicidal testing of the compounds of Examples 2 through 13 and of the comparative compound showed the results set forth in Table I. The plants are tabulated using the following abbreviations:

| | | | |
|---|---|---|---|
| Crabgrass | CG | Pigweed | PW |
| | | Turnip | TP |
| Johnson grass | JG | Cotton | CT |
| Barnyard grass | BG | Corn | CN |
| Bean | BN | | |

Table I

| | | Pre-/Post-Emergence | | | | | | | |
|---|---|---|---|---|---|---|---|---|---|
| Compound Example No. | Dosage Lbs./Acre | CG | JG | BG | PW | TP | CT | CN | BN |
| 2 | 4 | 80/70 | 40/40 | 40/30 | 100/100 | 20/70 | 100/40 | 0/20 | 100/100 |
| 3 | 8 | 80/90 | 60/80 | 70/40 | — | 90/100 | 30/80 | 0/30 | 0/100 |
| 4 | 8 | 90/90 | 40/30 | 20/30 | — | 90/100 | 30/50 | 40/0 | 80/100 |
|  | 4 | 30/40 | 20/20 | 0/20 | — | 20/80 | 80/50 | 0/20 | 0/90 |
| 5 | 8 | 80/90 | 30/40 | 20/40 | — | 0/100 | 80/50 | 40/0 | 0/100 |
| 6 | 8 | 0/50 | 20/30 | 20/30 | —/100 | 70/100 | 70/70 | 0/30 | 50/100 |
|  | 4 | — | — | — | —/100 | —/80 | — | — | — |
|  | 2 | — | — | — | —/80 | —/90 | — | — | — |
| 7 | 8 | 80/70 | 0/20 | 50/40 | — | 20/100 | 100/20 | 0/20 | 0/100 |
|  | 4 | — | — | — | — | —/70 | — | — | — |
| 8 | 8 | 70/60 | 20/30 | 40/30 | —/100 | 80/100 | 50/70 | 0/30 | 50/100 |
| 9 | 8 | 30/60 | 0/20 | 0/20 | — | 0/90 | 30/30 | 0/0 | 0/100 |
|  | 4 | — | — | — | — | 0/30 | — | — | — |
| 10 | 8 | 40/50 | 0/2 | 20/30 | — | 70/80 | 50/0 | 0/70 | 0/90 |
| 11 | 8 | 30/40 | 0/— | — | — | 20/100 | —/30 | — | 0/50 |
| 12 | 8 | 100/0 | 20/— | 60/— | — | 100/80 | 100/50 | 70/— | — |
|  | 4 | 0/— | 0/— | 0/— | — | 100/— | 100/— | 70/— | — |
|  | 2 | 70/— | 40/— | 30/— | — | 60/— | 30/20 | 20/— | — |
| 13 | 8 | 90/0 | 0/— | 0/— | — | 100/90 | 100/100 | 80/— | — |
|  | 4 | 80/— | 0/— | 0/— | — | 90/— | 100/— | 40/— | — |
|  | 2 | 30/— | 0/— | 0/— | — | 80/— | 30/— | 80/— | — |
| 14 | 8 | 40/0 | 0/— | 0/— | 20/—* | 20/20 | 0/0 | 0/— | 0/0 |

*Bindweed

Although the present invention has been described with preferred embodiments, it is to be understood that modifications and variations may be resorted to, without departing from the spirit and scope of this invention, as those skilled in the art will readily understand. Such modifications and variations are considered to be within the purview and scope of the appended claims.

What is claimed is:

1. The method for controlling plant growth that comprises applying an herbicidal amount of an herbicidal compound having the formula:

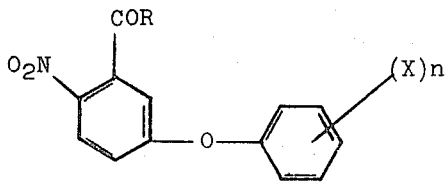

wherein X is halogen, n is 1 to 5, and R is amido, alkylamido ($C_1$–$C_6$), or dialkylamido ($C_1$–$C_6$).

2. The method of claim 1, wherein said compound is N-methyl 2-nitro-5-(2',4'-dichlorophenoxy)benzamide.

3. The method of claim 1, wherein said compound is N,N-dimethyl 2-nitro-5-(2',4'-dichlorophenoxy)benzamide.

4. The method of claim 1, wherein said compound is N,N-dimethyl 2-nitro-5-(2',4',6'-trichlorophenoxy)benzamide.

5. The method of claim 1, wherein said compound is N,N-dimethyl 2-nitro-5-(2',4'-dichloro-6'-fluorophenoxy)benzamide.

6. The method of claim 1, wherein said compound is N-sec-butyl 2-nitro-5-(2',4'-dichloro-6'-fluorophenoxy)benzamide.

7. The method of claim 1, wherein said compound is 2-nitro-5-(2',4',6'-trichlorophenoxy)benzamide.

8. An herbicidal composition comprising a carrier for an herbicide and an herbicidal amount of an herbicidal compound having the formula:

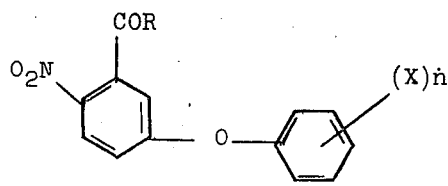

wherein X is halogen, n is 1 to 5, and R is amido, alkylamido ($C_1$–$C_6$), or dialkylamido ($C_1$–$C_6$).

9. The composition of claim 8, wherein said compound is N-methyl 2-nitro-5-(2',4'-dichlorophenoxy)benzamide.

10. The composition of claim 8, wherein said compound is N,N-dimethyl 2-nitro-5-(2',4'-dichlorophenoxy)benzamide.

11. The composition of claim 8, wherein said compound is N,N-dimethyl 2-nitro-5-(2',4',6'-trichlorophenoxy)benzamide 12. The composition of claim 8, wherein said compound is N,N-dimethyl 2-nitro-5-(2',4'-dichloro-6'-fluorophenoxy)benzamide.

13. The composition of claim 8, wherein said compound is N-sec-butyl 2-nitro-5-(2',4'-dichloro-6'-fluorophenoxy)benzamide.

14. The composition of claim 8, wherein said compound is 2-nitro-5-(2',4',6'-trichlorophenoxy)benzamide.

* * * * *

Disclaimer 3,873,303.—*Robert J. Theissen*, Westfield, N.J. HERBICIDAL USE AND COMPOSITION OF HALOPHENOXY BENZAMIDES. Patent dated Mar. 25, 1975. Disclaimer filed Oct. 17, 1988. by the assignee, *Rhone-Poulenc Agrochimie*.

Hereby enters this disclaimer to claims 1, 2, 3, 5, 6, 8, 9, 10, 12, and 13 of said patent.

[*Official Gazette April 18, 1989.*]